US007051749B2

(12) United States Patent
Wodjenski et al.

(10) Patent No.: US 7,051,749 B2
(45) Date of Patent: May 30, 2006

(54) GAS DELIVERY SYSTEM WITH INTEGRATED VALVE MANIFOLD FUNCTIONALITY FOR SUB-ATMOSPHERIC AND SUPER-ATMOSPHERIC PRESSURE APPLICATIONS

(75) Inventors: Michael J. Wodjenski, New Milford, CT (US); James A. Dietz, Scarsdale, NY (US)

(73) Assignee: Advanced Technology Materials, Inc., Danbury, CT (US)

( * ) Notice: Subject to any disclaimer, the term of this patent is extended or adjusted under 35 U.S.C. 154(b) by 95 days.

(21) Appl. No.: 10/720,357

(22) Filed: Nov. 24, 2003

(65) Prior Publication Data

US 2005/0109399 A1 May 26, 2005

(51) Int. Cl.
*G05D 7/00* (2006.01)

(52) U.S. Cl. .................................... 137/15.04; 137/240

(58) Field of Classification Search ................ 137/240, 137/238, 15.04

See application file for complete search history.

(56) References Cited

U.S. PATENT DOCUMENTS 5,137,047 A * 8/1992 George ........................ 137/240
5,657,254 A * 8/1997 Sierk et al. .................... 73/708
6,660,063 B1 * 12/2003 Tom et al. ...................... 95/90

* cited by examiner

*Primary Examiner*—Kevin Lee
(74) *Attorney, Agent, or Firm*—Steven J. Hultquist; Intellectual Property/Technology Law; Margaret Chappuis

(57) ABSTRACT

A gas cabinet including an enclosure containing at least one gas supply vessel and flow circuitry coupled to the gas supply vessel(s). The flow circuitry is constructed and arranged to flow dispensed gas from an on-stream gas supply vessel to multiple sticks of the flow circuitry, with each of the multiple sticks being joined in gas flow communication to a respective gas-utilizing process unit. The flow circuitry is valved to enable sections of the flow circuitry associated with respective ones of the multiple sticks to be isolated from other sections of the flow circuitry, so that process gas can be flowed to one or more of the sticks, while other sticks are being evacuated and purged, or otherwise are closed to dispensed gas flow therethrough.

20 Claims, 3 Drawing Sheets

GAS DELIVERY SYSTEM WITH INTEGRATED VALVE MANIFOLD FUNCTIONALITY FOR SUB-ATMOSPHERIC AND SUPER-ATMOSPHERIC PRESSURE APPLICATIONS

BACKGROUND OF THE INVENTION

The present invention relates to a gas delivery system for delivering gas to a gas-utilizing process, e.g., for semiconductor manufacture. More specifically, the invention relates to a gas delivery system with an integrated valved manifold useful for sub-atmospheric as well as super-atmospheric pressure applications.

DESCRIPTION OF THE RELATED ART

In current semiconductor industry practice, gases are conventionally delivered from gas delivery systems including gas cabinets. Gas cabinets typically are fabricated as enclosure structures having doors or access panels, containing a supply of semiconductor manufacturing gas, e.g., in the form of one or more gas storage and dispensing vessels, together with associated piping, manifolding, valves, instrumentation, controllers (central processing units, programmable logic controllers, automatic shut-off systems, etc.) and outputs (alarms, screen displays, etc.), arranged for dispensing and delivery of gas to an associated semiconductor manufacturing process.

Gas cabinets generally are of three basic types: (i) sub-atmospheric pressure gas supply cabinets, from which gas is dispensed at sub-atmospheric pressure from a gas supply vessel, (ii) low pressure gas supply cabinets, from which the gas is dispensed from a gas supply vessel at low above-atmospheric pressure, and (iii) standard high pressure delivery gas supply cabinets, from which high pressure gas is dispensed from a high pressure gas supply vessel. In the case of standard high pressure gas supply cabinets, the associated flow circuitry (piping, valves, manifolds, fittings, etc.) characteristically includes a pressure regulator for control of gas dispensing at a desired super-atmospheric pressure level.

In all of the aforementioned categories, the gas cabinet provides at least one outlet for delivery of process gas to the semiconductor manufacturing process, e.g., to a semiconductor manufacturing tool in which the gas is used as a source material for film deposition, as an etchant for etching of previously deposited layers in the semiconductor device structure, as a cleaning medium for removal of particles, photoresisist ash residues, or residual chemicals or oxide deposits, etc.

When two outlets are required from the gas cabinet, such as when multiple tools are supplied with the dispensed gas from a single vessel in the gas cabinet, the most common conventional approach is to employ an extra valve on the process outlet line, e.g., a manually-actuated valve, to accommodate the two outlets. One problem associated with such use of a manual valve is the absence of any automatic interlocking capability for independent isolation of each of the outlets. As a result, each of the two semiconductor manufacturing processes utilizing the single gas supply/dual outlet arrangement are vulnerable to problems and failures in the other process.

For example, if one process tool experiences backflow of the delivered gas, both processes being supplied with gas from the gas cabinet will be affected. Further, if one process tool has an alarm that actuates shut-off of the gas supply, both processes will be terminated by the resulting stoppage of gas flow. Additionally, routine maintenance, such as purging and evacuation of process lines, cannot be carried out utilizing the vacuum generator and purge gas supply that is conventionally associated with the cabinet, if gas flow is maintained on one of the two outlets.

The above-described problems incident to the use of an additional manual valve in a single supply/dual outlet gas cabinet arrangement, relating to interlock capability and backflow, can be resolved if an automatic valve is employed instead of a manual valve, with a pressure transducer or pressure switch on the outlets to enable interlock capability and to prevent backflow problems, by appropriate closure of the automatic valve.

Although the dual outlet scheme described hereinabove is utilized in some instances, the more common approach to accommodating a single gas supply to multiple downstream semiconductor manufacturing tools involves the provision of a valve manifold box (VMB).

The valve manifold box is a separate dedicated apparatus unit, distinct from the gas cabinet, for delivery of gas from single source vessel to multiple points of use. The VMB has an inlet port to accept gas from the gas cabinet, with the port being coupled to the gas dispensing line from the gas cabinet, and the VMB functioning to split the gas stream from the gas cabinet dispensing line into multiple streams that are discharged from the valve manifold box in multiple outlets. The gas pressure of the dispensed gas stream may be regulated at the gas cabinet or at each individual outlet of the VMB, e.g., by provision of flow control valves, regulators, restrictive flow orifices, or other gas pressure-regulating elements, at such locations.

The VMB is typically constructed to allow for independent monitoring, control and maintenance of each so-called process "stick," i.e., the portion of the flow circuitry that is associated with a given outlet port of the VMB and functions to feed gas from the VMB to the associated downstream process tool.

The independent character of the respective sticks that are associated with the VMB and fed from the single gas supply in the gas cabinet coupled to the VMB, permits termination of gas flow through one or more of the sticks that connected with corresponding one(s) of the multiple semiconductor tools being served by the single gas supply in the gas cabinet, without interruption of gas flow through the other stick(s) serving other process tool(s).

Such independent functionality of respective sticks is achieved by (i) provision in the VMB unit of vacuum and purge gas inlet valves to each stick, i.e., respective valves controlling active connection of the stick with a vacuum source for evacuation of the stick flow circuitry, and active connection with the purge gas supply for displacement purging of the stick flow circuitry with the purge gas, as well as (ii) the inclusion of pressure monitoring and automatic isolation valves on the respective sticks.

The problem with the foregoing VMB arrangement is that the VMB unit is relatively expensive, so that the process owner must choose between the provision of a VMB to accommodate multiple outlets to the multiple tools, or alternatively the use of a dedicated single gas cabinet for each of the multiple tools, or the provision of automatic valves, with corresponding loss of multi-tool gas supply capability from a single gas supply.

In resolving this dilemma, consideration must be taken of the fact that the cost of automated valves typically is as high or higher than the cost of a fully optioned gas cabinet. In addition, besides the high hardware costs associated with a VMB, the VMB also requires facilitation (the provision of infrastructural, e.g., utilities and installation, requirements) in the semiconductor fab. The facilitation of a VMB is equivalent to the cost of facilitating a gas cabinet, and there are additional facilities costs associated with the operation of the VMB, in the form of exhaust and gas monitoring requirements.

In addition to capital equipment and operating costs associated with conventional multi-outlet gas delivery systems, limitations are imposed by such cabinets on the number of available gas outlets and the potential loss of process time of multiple tools, when maintenance is required on the multi-outlet gas delivery system.

Another barrier to economic use of multi-outlet gas delivery systems is the cost of plumbing from a remote location to the semiconductor tool. When conventional high-pressure gas cylinders are employed as the gas supply in the gas cabinet, the gas cabinets for safety reasons are typically located a significant distance away from the point of use.

Further, because of the hazardous character of many high-pressure gases, and safety considerations associated with high pressure operation, coaxial tubing is typically employed to transport gas from the gas cabinet to the process tool. Coaxial tubing, however, is costly to run, and the deployment of multiple delivery lines from the gas cabinet, each of a coaxial character, is in many instances prohibitive in cost. As a result, the semiconductor manufacturer is forced to run a single line to the point of use, and to use a VMB to split the flow into multiple ports for flow to the multiple tools at the point of use.

SUMMARY OF THE INVENTION

The present invention relates to a gas delivery system for delivering gas to a gas-utilizing process, in which the gas delivery system includes an integrated valved manifold.

In one aspect, the invention relates to a gas cabinet including an enclosure containing at least one gas supply vessel and flow circuitry coupled to the gas supply vessel(s), and including multiple sticks each of which is arranged for gas flow communication to a respective gas-utilizing process unit, with a vacuum source and a purge gas source being coupled to the flow circuitry and arranged for evacuation and purging of one or more of the multiple sticks, wherein the flow circuitry is valved to enable portions of the flow circuitry associated with respective ones of the multiple sticks to be isolated from other portions of the flow circuitry, so that process gas can be flowed to one or more of the sticks, while other sticks are being evacuated and purged, or otherwise are closed to flow of dispensed gas therethrough.

In another aspect, the invention relates to a method of supplying gas to multiple gas-utilizing process units from a gas cabinet including an enclosure containing a gas supply vessel, such method including, in a first mode of operation, flowing gas from the gas supply vessel through a flow circuitry including multiple sticks each of which is arranged for gas flow communication to a respective gas-utilizing process unit, and in a second mode of operation, isolating portions of the flow circuitry associated with selected ones of the multiple sticks from other portions of the flow circuitry, so that gas can be flowed to one or more of the sticks, while evacuating and purging other sticks, or otherwise closing same to flow of gas therethrough.

Other aspects, features and embodiments will be more fully apparent from the ensuing disclosure and appended claims.

DETAILED DESCRIPTION OF THE INVENTION, AND PREFERRED EMBODIMENTS THEREOF

Figure 1:
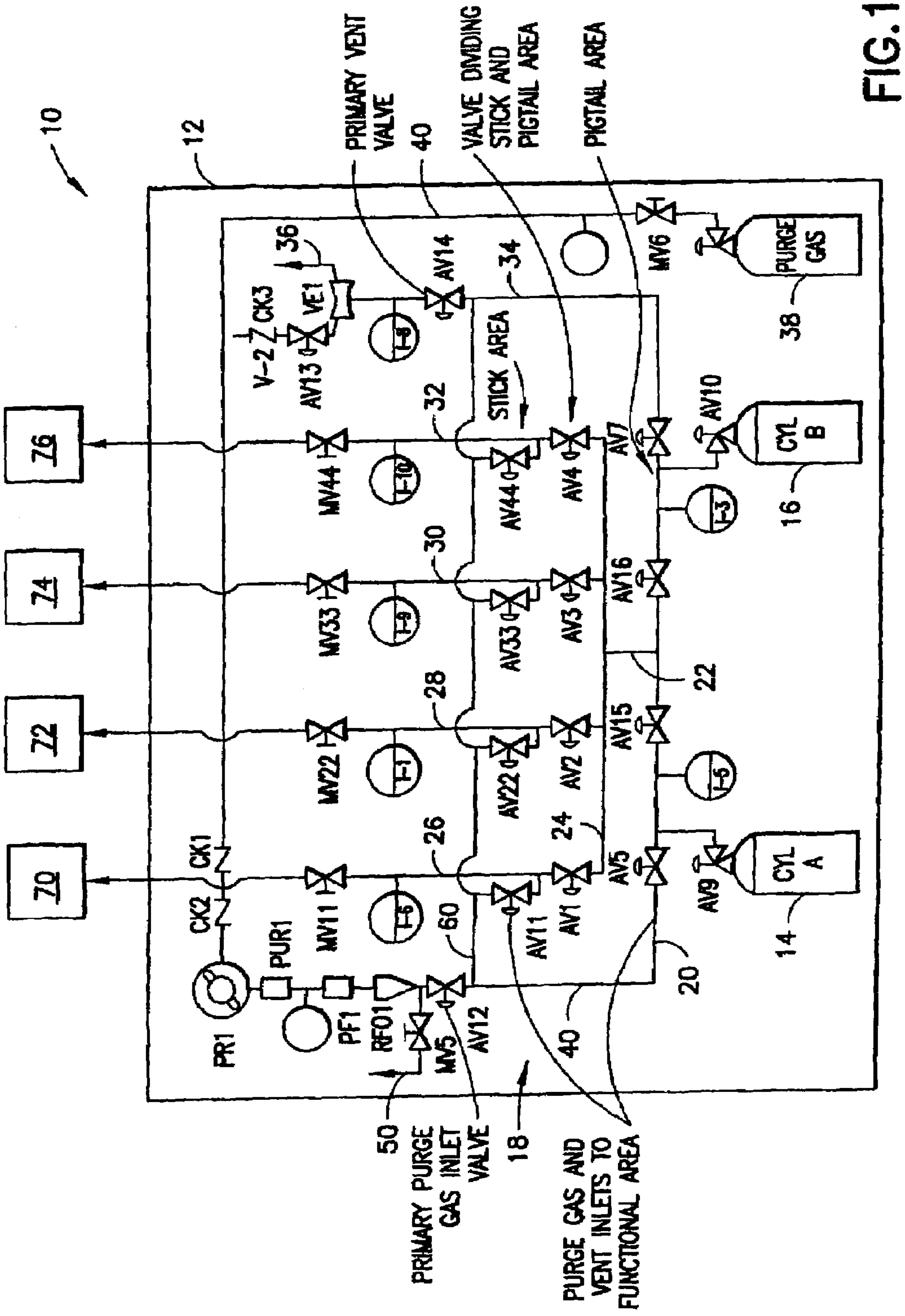
FIG. 1 is a schematic representation of a sub-atmospheric gas supply and dispensing system utilizing an integrated valved manifold, according to one embodiment of the invention.

The present invention embodies a departure from conventional design of gas cabinets, and utilizes an integrated valved manifold in connection with sources of vacuum and purge gas, and flow circuitry including the integrated valved manifold, with such flow circuitry being coupled with one or more gas storage and dispensing vessels, and wherein the flow circuitry includes suitable valve, regulator and flow monitoring and control devices for enabling independent control of flow circuitry sections servicing respective ones of multiple semiconductor manufacturing tools.

In such gas cabinet, the provision of the integrated valved manifold provides the gas cabinet with the capability to service multiple semiconductor manufacturing tools, in the same functional manner as a prior art gas cabinet coupled with a separate dedicated valve manifold box (VBM).

Additionally, the gas cabinet of the invention has the ability to evacuate and purge specific sections of the gas flow circuitry, while maintaining other sections of the flow circuitry operable for delivery of gas.

Thus, the flow circuitry includes functional sections independently associable with each of the respective semiconductor tools that are arranged to receive gas from the gas cabinet, and the flow relationship may selectively be open or closed with respect to given one(s) of the multiple semiconductor manufacturing tools.

The vacuum and purge gas sources in the gas cabinet are coupled with the flow circuitry, in such manner that independent control of respective functional sections of the flow circuitry is enabled. The functional sections have an isolation valve between them, which allows operation of a process routine in one functional section without affecting operation in other section(s).

The functional sections of the flow circuitry are the sticks, the portions of the flow circuitry that conduct the gas from the valved manifold of the flow circuitry to the semiconductor process tools, and the so-called pigtails, the portions of the flow circuitry at which gas supply and dispensing vessels are connected to the valved manifold to enable dispensing of gas from the gas supply and dispensing vessels through the flow circuitry.

By inclusion of an isolation valve between respective functional sections, it is possible to utilize separate alarm functions, as well as separate shut-down, start-up and maintenance routines for each of the functional sections of the flow circuitry.

In one embodiment, the integrated manifold gas cabinet of the invention is advantageously utilized with low-pressure or sub-atmospheric pressure gas sources, such as the gas storage and dispensing vessels commercially available from ATMI, Inc. (Danbury, Conn.) under the trade names "VAC" and "SAGE."

The gas storage and dispensing vessels commercially available under the VAC trademark contain pressurized fluid and an internally mounted pressure regulator that permits gas dispensing at low superatmospheric pressures, thereby avoiding the safety issues confronted in use of conventional high pressure gas cylinders.

The gas storage and dispensing vessels commercially available under the SAGE trademark contain a sorbent medium on which the gas to be dispensed is sorptively retained until desorbed for active dispensing operation.

These preferred low-pressure and sub-atmospheric pressure gas sources permit the gas cabinet to be situated close to the tool. As a result, the cost of piping many process lines to the respective semiconductor manufacturing tools becomes correspondingly practical, in relation to prior art practice where high-pressure gas cylinders necessitate substantial distances to be maintained between the gas cabinet and process tool.

Further, the use of the preferred low pressure and sub-atmospheric gas sources eliminates the needs for coaxial piping to be used for the process lines to the semiconductor manufacturing tool. Since coaxial piping is not required, piping costs for the semiconductor manufacturing facility can be substantially reduced.

The integrated manifold gas cabinet of the present invention can also be utilized with conventional high-pressure gas sources, such as superatmospheric pressure gas cylinders, with many of the same advantages as are applicable to use of low pressure and sub-atmospheric gas sources, except that coaxial piping desirably is utilized when high pressure gas cylinders are employed, for reasons of safety and compliance with existing standards and regulations applicable to high pressure gas sources.

The high-pressure configurations of the integrated manifold gas cabinet of the invention may be embodied in two basic forms.

In a first form, the flow circuitry in the gas cabinet includes a regulator between the pigtail area and the sticks.

In a second form, the flow circuitry in the gas cabinet includes a regulator on each individual stick at its inlet end.

A combination of the aforementioned first and second forms may also be employed, in which regulators are provided between the pigtail and sticks, as well as on the individual sticks of the flow circuitry.

Referring now to the drawings, FIG. 1 is a schematic representation of an integrated manifold gas cabinet 10, according to one embodiment of the invention.

For ease of illustration, the flow circuitry and fluid vessels of the integrated gas cabinet 10 are shown in FIG. 1 in a simplified schematic fashion, in which the gas cabinet includes a housing or enclosure 12, in which is mounted a first gas supply vessel 14, denoted Cyl. A, and a second gas supply vessel 16, denoted Cyl. B, each of which has a respective valve head assembly valve (AV9 for Cyl. A and AV10 for Cyl. B).

Each of the gas storage and dispensing vessels 14 and 16 is coupled to the flow circuitry 18 at respective pigtail areas. The pigtail areas are associated with manifold line 20 containing automatic valves AV5, AV15, AV16 and AV7, which is connected by branch line 22 to the stick manifold 24, which in turn is connected with sticks 26, 28, 30 and 32. Stick 26 contains automatic valve AV1 and manual valve MV11. Stick 28 contains automatic valve AV2 and manual valve MV22. Stick 30 contains automatic valve AV3 and manual valve MV33, and stick 32 contains automatic valve AV4 and manual valve MV44. These manual valves in the respective sticks can be selectively opened or closed to facilitate flow of gas through the sticks containing open valves, to the semiconductor manufacturing tools 70, 72, 74 and/or 76, as are operated at a given time in the semiconductor manufacturing operation.

As illustrated, manifold line 20 is connected to vent line 34 containing automatic valve AV14 and coupled with venturi VE1 disposed in venturi line 36 containing check valve CK3 and automatic valve AV13, arranged to selectively exert vacuum on the manifold line 20.

The gas cabinet enclosure 12 also contains a purge gas vessel 38 ("Purge Gas"), coupled to purge line 40 containing manual valve MV6 therein, such purge line 40 also having check valves CK1 and CK2 therein, upstream of the pressure regulator PR1. Disposed in purge line 40 downstream of the pressure regulator is the purifier, PUR1, followed by purge flow meter PF1, restricted flow orifice RFO1 and primary purge gas inlet valve AV12. Coupled with the purge line 40 is a purge gas discharge line 50 containing manual valve MV5.

The flow circuitry 18 includes the automatic valves AV1, AV2, AV3 and AV4 at the inlet end regions of the respective sticks 26, 28, 30 and 32. Downstream of the automatic valves AV1, AV2, AV3 and AV4, the respective sticks are coupled with purge manifold line 60 which in turn is joined to purge line 40, as illustrated. The purge manifold line 60 includes respective purge manifold line loops containing valves AV11, AV22, AV33 and AV44, to provide flow of purge gas to the sticks 22, 24, 26 and 28, respectively.

The sticks 22, 24, 26 and 28 are coupled in gas supply relationship with semiconductor manufacturing tools 70, 72, 74 and 76, respectively.

In operation, the flow circuitry 18 can be operated so that any of valves AV1, AV2, AV3 and AV4 between the respective main sections of the sticks and the pigtail areas can be selectively opened or closed, and the automatic valves AV15 and AV16 may be respectively opened and closed, so that one of the two gas storage and dispensing vessels 14 and 16 (Cyl. A and Cyl. B) is on-stream in the gas dispensing mode, with the flow control valve in its valve head assembly open, while the other vessel is off-stream and has the flow control valve of its valve head assembly closed.

By this arrangement, the respective valves in manifold line 20 can be selectively opened or closed to permit a selected one of the gas supply and dispensing vessels 14 and 16 to be changed out when it is depleted, with flow then being switched to the other of the vessels 14 and 16.

The depleted vessel then is replaced with a fresh (full) vessel at the corresponding pigtail area of manifold 20 and held in reserve, for changeover thereof to active dispensing operation when the other vessel subsequently becomes depleted. In this manner, continuous flow operation can be maintained, using tandem vessels that are successively switched and replaced with fresh vessels containing the gas to be dispensed.

Concurrently, any of the stick lines of the flow circuitry can be isolated by appropriate valve closure (of the corresponding stick inlet valve AV1, AV2, AV3 or AV4) and subjected to vacuum-mediated gas removal, by action of the venturi VE1, and with purge gas being flowable through the isolated stick(s) of the flow circuitry from purge manifold line 60, to permit purging of one or more sticks, while other(s) remain on-stream.

In the purging operation, purge gas from the purge gas vessel 38 is flowed through valve MV6 into purge line 40 from which it may be flowed into purge manifold line 60 and open purge manifold line loops containing the purge gas valves AV11, AV22, AV33 and AV44.

By the valving and manifolding in the flow circuitry 18, it is possible to isolate selected one(s) of the sticks, to discontinue flow of gas to the associated downstream semiconductor manufacturing tool(s), and to vacuum evacuate and purge the isolated stick(s) and associated flow circuitry.

The gas storage and dispensing vessels 14 and 16 (Cyl. A and Cyl. B), in a preferred embodiment of the FIG. 1 integrated manifold gas cabinet, are sub-atmospheric pressure vessels of a type commercially available from ATMI, Inc. (Danbury, Conn.) under the trademark SAGE.

It will be appreciated that the flow circuitry in the FIG. 1 embodiment is constructed and arranged so that dispensed process gas, as well as vacuum and purge gas, can be delivered to each of the functional sections of the flow circuitry in the gas cabinet that serve respective semiconductor manufacturing tools, to facilitate independent control of respective functional sections of the flow circuitry.

The valves dividing the stick and pigtail areas of the flow circuitry therefore provide multiple process outlets associated with a single gas supply vessel, and permit isolation of respective sticks for vacuum-based evacuation, purging, routine maintenance, etc.

It will be appreciated that while the gas cabinet of FIG. 1 has been illustratively shown as containing two alternative gas supply vessels 14 and 16, more than two such vessels can be provided in the gas cabinet and be coupled at pigtail regions to a manifold of the flow circuitry, to provide greater flexibility of operation, as may be necessary or desirable in a given application of the invention.

Figure 2:
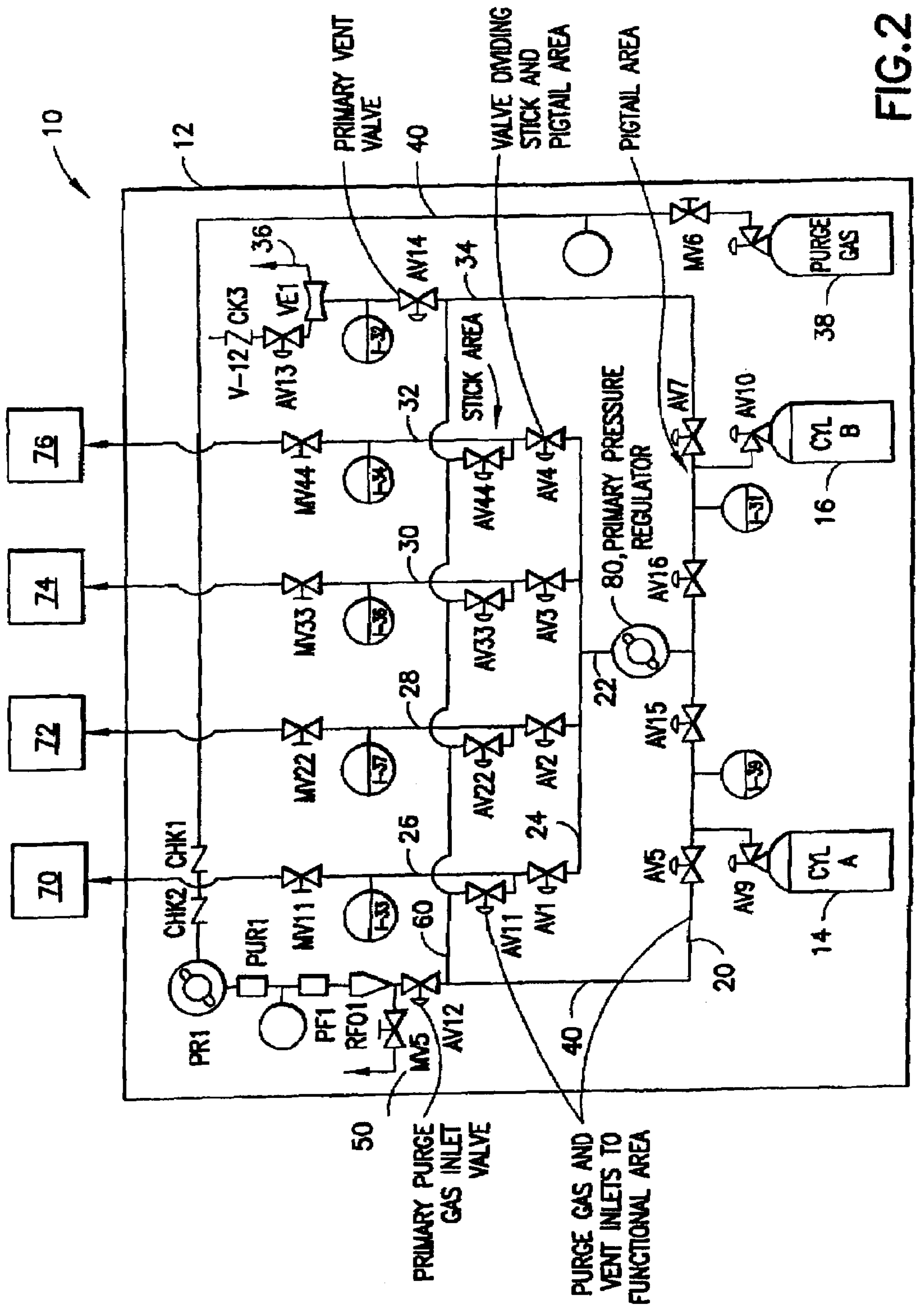
FIG. 2 is a schematic representation of a super-atmospheric gas delivery system utilizing an integrated valved manifold, according to another embodiment of the invention.

FIG. 2 is a schematic representation of an integrated valved manifold gas cabinet, according to another embodiment of the invention. In the schematic representation of FIG. 2, corresponding elements to those discussed hereinabove in connection with the FIG. 1 embodiment are correspondingly identified by the same reference characters.

It will be seen by comparison of FIGS. 1 and 2 that the FIG. 2 embodiment differs by the provision of a primary pressure regulator 80 in branch line 22 between the manifold line 20 and the stick manifold 24. The configuration shown in FIG. 2 accommodates super-atmospheric pressure gas supply vessels 14 and 16, in which the primary pressure regulator 80 serves to control pressure of the gas dispensed from the single on-stream gas supply vessel to the stick manifold 24, from which gas is flowed into respective stick(s) having open valves therein.

Figure 3:
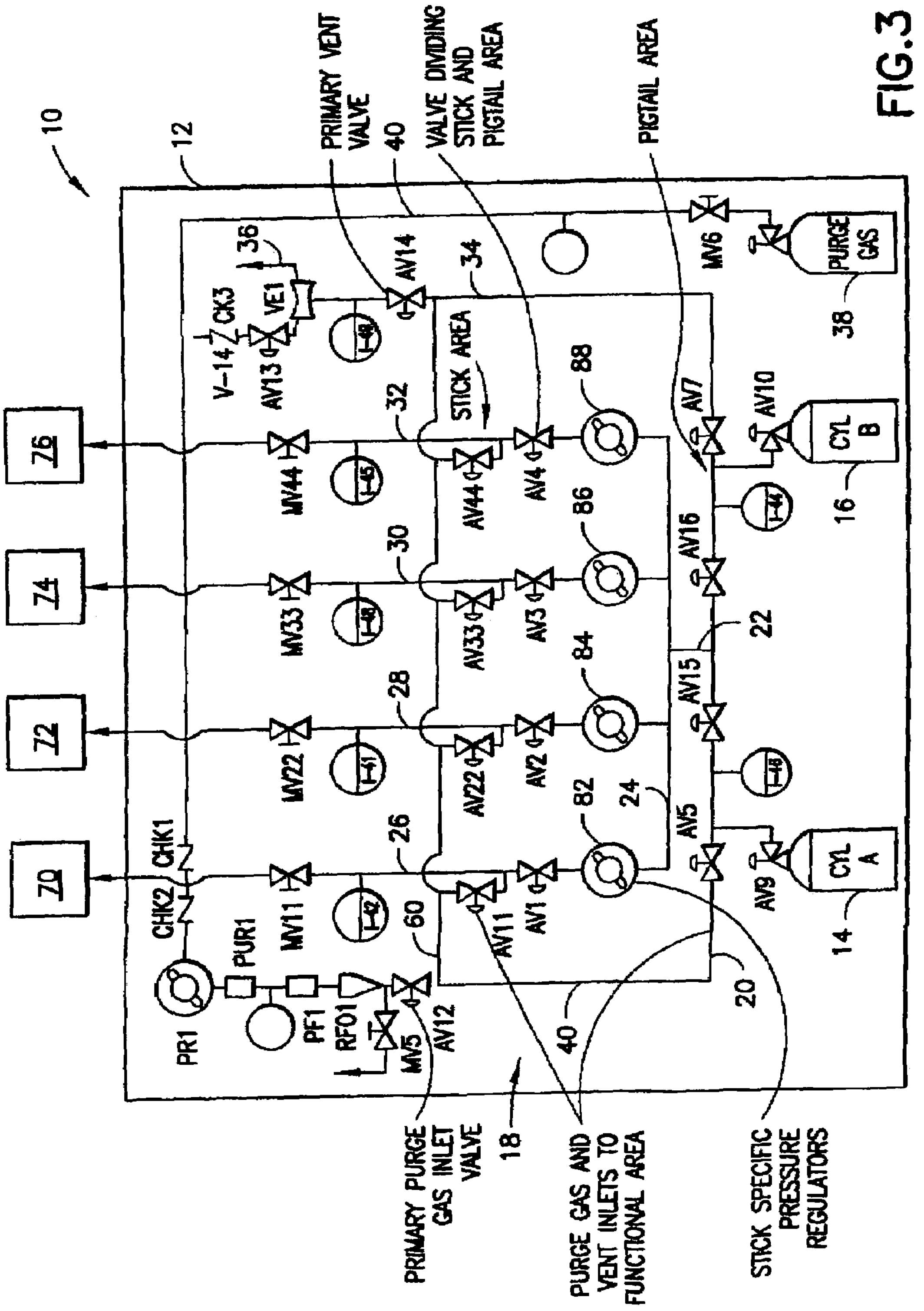
FIG. 3 is a schematic representation of a gas delivery system for super-atmospheric pressure delivery, featuring an integrated valved manifold, according to a further embodiment of the invention.

FIG. 3 is a schematic representation of another integrated valved manifold gas cabinet, in which corresponding elements in FIG. 3 are numbered correspondingly with respect to those described hereinabove in connection with FIGS. 1 and 2. It will be seen that the system of FIG. 3 differs from that of FIG. 2 in the provision of individual pressure regulators in stick lines, including pressure regulator 82 in stick 26, pressure regulator 84 in stick 28, pressure regulator 86 in stick 30 and pressure regulator 88 in stick 32.

The system shown in FIG. 3 is constructed and arranged for operation with super-atmospheric pressure gas supply vessels, whereby gas from the single on-stream gas supply and dispensing vessel is discharged into the manifold line 20 and flowed through branch line 22 to stick manifold 24, from which gas flows into the stick line(s) having open valves (AV1, AV2, AV3 and AV4) therein. In this manner, the high-pressure gas entering the stick is regulated in pressure by the associated up-stream pressure regulator in such stick line, so that gas is flowed into the down-stream semiconductor manufacturing tool at a desired pressure level.

It will therefore be seen that the gas cabinet arrangement of the present invention permits a single gas storage and dispensing vessel to provide gas to multiple use points through the valved manifold flow circuitry, with vacuum and purge operations being concurrently able to be performed on sticks not engaged in gas delivery to process tools in the semiconductor manufacturing facility.

While the invention has been illustratively described herein with reference to specific aspects, features and embodiments, it will be recognized that the invention is not thus limited, but rather is susceptible to implimentation in alternative forms, involving variations, modifications and alternative embodiments in relation to the specifically disclosed embodiments herein, as will suggest themselves to those of ordinary skill in the art, based on the disclosure herein.

Accordingly, the invention as hereinafter claimed is intended to be broadly construed, as including all such variations, modifications and alternative embodiments, within the spirit and scope thereof.

What is claimed is:

1. A gas cabinet including an enclosure containing at least one gas supply vessel and flow circuitry coupled to the gas supply vessel(s), and including multiple sticks each of which is arranged for gas flow communication to a respective gas-utilizing process unit, with a vacuum source and a purge gas source being coupled to the flow circuitry and arranged for evacuation and purging of one or more of the multiple sticks, wherein the flow circuitry is valved to enable portions of the flow circuitry associated with respective ones of the multiple sticks to be isolated from other portions of the flow circuitry, so that process gas can be flowed to one or more of the sticks, while other sticks are being evacuated and purged, or otherwise are closed to flow of dispensed gas therethrough, wherein the gas cabinet is characterized by at least one of the following characteristics (1) and (2):

(1) none of the multiple sticks containing a pressure regulator therein; and (2) the gas cabinet including a purifier arranged for flow therethrough of gas from the purge gas source.

2. The gas cabinet of claim 1, wherein each gas supply vessel comprises a vessel containing gas and an interiorly mounted gas pressure regulator, arranged so that gas dispensed from the vessel flows through said gas pressure regulator prior to flow from the vessel to said flow circuitry coupled thereto.

3. The gas cabinet of claim 1, wherein each gas supply vessel comprises a vessel containing a physical adsorbent medium sorptively retaining gas thereon, arranged so that gas is desorbed from the physical adsorbent medium during dispensing of gas from the vessel to said flow circuitry coupled thereto.

4. The gas cabinet of claim 1 wherein the enclosure contains two gas supply vessels.

5. The gas cabinet of claim 4, wherein the flow circuitry includes a manifold line to which said two gas supply vessels are coupled, and valves in the manifold line arranged so that one of the two gas supply vessels is in a dispensing mode while the other of the two gas supply vessels is in a non-dispensing standby mode.

6. The gas cabinet of claim 5, wherein said flow circuitry comprises a branch line connecting the manifold line with a stick manifold to which the multiplicity of sticks is connected.

7. The gas cabinet of claim 6, wherein the flow circuitry further comprises a purge gas manifold line connected by valved purge loops to the multiplicity of sticks, and a purge gas line interconnecting the purge gas source with the purge gas manifold line.

8. The gas cabinet of claim 7, wherein the flow circuitry further comprises a vent line interconnecting the manifold line with the vacuum source.

9. The gas cabinet of claim 8, wherein the vacuum source includes a venturi device.

10. The gas cabinet of claim 8, wherein the purge gas line has a restricted flow orifice therein.

11. The gas cabinet of claim 7, wherein each of the multiple sticks has a valve at its inlet end portion, upstream of the valved purge loop connection to the stick, and a valve downstream of the valved purge loop connection to the stick.

12. The gas cabinet of claim 6, wherein said branch line contains a pressure regulator arranged to regulate pressure of gas flowed into the sticks at a predetermined pressure level.

13. The gas cabinet of claim 6, wherein each of said multiplicity of sticks contains a pressure regulator at an inlet end portion thereof, arranged to regulate pressure of gas flowed into the sticks.

14. The gas cabinet of claim 6, wherein said branch line contains a pressure regulator, and wherein each of said multiplicity of sticks contains a pressure regulator at an inlet end portion thereof.

15. The gas cabinet of claim 1, wherein said gas supply vessel(s) contain a semiconductor manufacturing gas.

16. A gas cabinet including an enclosure containing at least one gas supply vessel and flow circuitry coupled to the gas supply vessel(s), and including multiple sticks each of which is arranged for gas flow communication to a respective gas-utilizing process unit, with a vacuum source and a purge gas source being coupled to the flow circuitry and arranged for evacuation and purging of one or more of the multiple sticks, wherein the flow circuitry is valved to enable portions of the flow circuitry associated with respective ones of the multiple sticks to be isolated from other portions of the flow circuitry, so that process gas can be flowed to one or more of the sticks, while other sticks are being evacuated and purged, or otherwise are closed to flow of dispensed gas therethrough, wherein the enclosure contains two gas supply vessels, wherein the flow circuitry includes a manifold line to which said two gas supply vessels are coupled, and valves in the manifold line arranged so that one of the two gas supply vessels is in a dispensing mode while the other of the two gas supply vessels is in a non-dispensing standby mode, wherein said flow circuitry comprises a branch line connecting the manifold line with a stick manifold to which the multiplicity of sticks is connected, wherein the flow circuitry further comprises a purge gas manifold line connected by valved purge loops to the multiplicity of sticks, and a purge gas line interconnecting the purge gas source with the purge gas manifold line, wherein the flow circuitry further comprises a vent line interconnecting the manifold line with the vacuum source, wherein the purge gas line has a restricted flow orifice therein, and wherein the purge gas line has a purifier therein, upstream of the restricted flow orifice.

17. The gas cabinet of claim 16, wherein the purge gas line has a pressure regulator therein, upstream of the purifier.

18. The gas cabinet of claim 17, wherein the purge gas line has at least one check valve therein, upstream of the pressure regulator.

19. The gas cabinet of claim 18, wherein the purge gas line has a valved purge gas vent line coupled thereto.

20. A method of supplying gas to multiple gas-utilizing process units from a gas cabinet including an enclosure containing a gas supply vessel, said method comprising in a first mode of operation, flowing gas from the gas supply vessel through a flow circuitry including multiple sticks each of which is arranged for gas flow communication to a respective gas-utilizing process unit, and in a second mode of operation, isolating portions of the flow circuitry associated with selected ones of the multiple sticks from other portions of the flow circuitry, so that gas can be flowed to one or more of the sticks, while evacuating and purging other sticks, or otherwise closing same to flow of gas therethrough, wherein the gas cabinet is characterized by at least one of the following characteristics (1) and (2):

(1) none of the multiple sticks containing a pressure regulator therein; and (2) the gas cabinet including a purifier arranged for flow therethrough of gas for said purging.

* * * * *